(12) United States Patent
Jung

(10) Patent No.: US 12,556,408 B2
(45) Date of Patent: Feb. 17, 2026

(54) VEHICLE AND CERTIFICATE VALIDATION METHOD OF VEHICLE

(71) Applicants: HYUNDAI MOTOR COMPANY, Seoul (KR); KIA CORPORATION, Seoul (KR)

(72) Inventor: Hojin Jung, Bucheon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 212 days.

(21) Appl. No.: 18/214,803

(22) Filed: Jun. 27, 2023

(65) Prior Publication Data

US 2024/0179012 A1    May 30, 2024

(30) Foreign Application Priority Data

Nov. 25, 2022 (KR) .................. 10-2022-0160550

(51) Int. Cl.
*H04L 29/06* (2006.01)
*H04L 9/32* (2006.01)

(52) U.S. Cl.
CPC .......... *H04L 9/3263* (2013.01); *H04L 9/3268* (2013.01)

(58) Field of Classification Search
CPC .. H04L 9/3263; H04L 2209/84; H04L 9/3268
See application file for complete search history.

(56) References Cited

U.S. PATENT DOCUMENTS

| | | | |
|---|---|---|---|
| 9,264,235 B2* | 2/2016 | Truskovsky | H04L 9/3263 |
| 10,706,646 B2* | 7/2020 | Ahn | G07C 5/008 |
| 11,246,032 B1* | 2/2022 | Maass | H04L 9/0861 |
| 2002/0184182 A1* | 12/2002 | Kwan | H04L 9/3268 |
| 2008/0148046 A1* | 6/2008 | Glancey | G06F 21/34 |
| | | | 713/156 |
| 2013/0340064 A1* | 12/2013 | Kostiainen | H04L 9/0869 |
| | | | 726/10 |
| 2018/0019994 A1* | 1/2018 | Chang | H04L 63/0838 |
| 2019/0034637 A1* | 1/2019 | Cho | H04L 63/08 |
| 2019/0281052 A1* | 9/2019 | Lekkas | H04L 9/14 |

\* cited by examiner

*Primary Examiner* — Harunur Rashid
(74) *Attorney, Agent, or Firm* — Banner & Witcoff, Ltd.

(57) ABSTRACT

A certificate validation method of a vehicle may include: receiving, by a controller of a vehicle and from an external device, a certificate for authenticating the external device; and based on a determination that wireless communication is available between the controller and a certificate validation server: sending, by the controller and to the certificate validation server, the certificate without a certificate revocation list (CRL) for verification of validity of the certificate; and requesting the certificate validation server to validate the certificate without the CRL.

15 Claims, 5 Drawing Sheets

| Byte | PARAMETER NAME | HEX VALUE |
|---|---|---|
| #1d | SecurityAccess Request SID | #27h |
| #2d | sub-function = [securityAccessType= sendCertificateandrequestSeed] | #XXh |
| #3d ... #nd | securityAccessDataRecord = [Certificate] | #XXh ... #XXh |

310: CERTIFICATE DELIVERY AND SEED REQUEST MESSAGE

FIG. 3

| Byte | PARAMETER NAME | HEX VALUE |
|---|---|---|
| #1d | SecurityAccess Response SID | #67h |
| #2d | sub-function = [securityAccessType= sendCertificateandrequestSeed] | #XXh |
| #3d | securityAccessDataRecord = [Request CRL] | #XXh |

510: CRL REQUEST MESSAGE

| Byte | PARAMETER NAME | HEX VALUE |
|---|---|---|
| #1d | SecurityAccess Request SID | #27h |
| #2d | sub-function = [securityAccessType= sendCRLandrequestSeed] | #XXh |
| #3d ... #nd | securityAccessDataRecord = [CRL] | #XXh ... #XXh |

520: CRL DELIVERY AND SEED REQUEST MESSAGE

FIG. 5

VEHICLE AND CERTIFICATE VALIDATION METHOD OF VEHICLE

CROSS-REFERENCE TO RELATED APPLICATION

This application is based on and claims priority to Korean Patent Application No. 10-2022-0160550, filed on Nov. 25, 2022 in the Korean Intellectual Property Office, the disclosure of which is incorporated herein by reference.

TECHNICAL FIELD

The disclosure relates to a vehicle, and more particularly, to validation of a certificate of an external device connected to the vehicle.

BACKGROUND

With the advancement in performance of a device controlling a vehicle, a role of the control device has become more critical, and the number of issues related to vehicle security (e.g., hacking) is on the rise. An on-board diagnostics connector (OBD-II connector) located under a driver's seat is one of the most vulnerable parts in vehicle security. A gateway of vehicle is installed in the OBD-II connector. An external diagnostic device may access various control devices of the vehicle through the gateway connected to a high-speed controller area network (CAN) and request the various control devices to perform a variety of functions for diagnosing the vehicle.

The external diagnostic device, once connected to the OBD-II connector which is crucial for vehicle security, may transmit, to the control device of the vehicle, a certificate issued by a vehicle manufacturer for authentication of the external diagnostic device itself and a certificate revocation list (CRL) for verifying validity of the certificate. The CRL includes information about whether the corresponding certificate is valid/expired.

A validity period of the certificate may be relatively long, but a validity period of a CRL matching the certificate may be significantly shorter compared to that of the certificate for security reasons. Accordingly, a user of the external diagnostic device is required to frequently download (e.g., receive) the CRL due to the short validity period. Conventionally, a user of the external diagnostic device downloads the CRL after connecting the external diagnostic device to a communication network by wire, causing inconvenience to the user.

SUMMARY

It is an object of the disclosure to enable online certificate validation of an external diagnostic device in a wireless method. Also, it is another object of the disclosure to, when online validation in a wireless method of an external diagnostic device is not available, perform offline certificate validation in a wired method by selectively performing online validation in a wireless method or offline validation in an existing wired method depending on a communication state.

Additional aspects of the disclosure will be set forth in part in the description which follows and, in part, will be obvious from the description, or may be learned by practice of the disclosure.

According to one or more example embodiments of the present disclosure, a method may include: receiving, by a controller of a vehicle and from an external device, a certificate for authenticating the external device; and based on a determination that wireless communication is available between the controller and a certificate validation server: sending, by the controller and to the certificate validation server, the certificate without a certificate revocation list (CRL) for verification of validity of the certificate; and requesting the certificate validation server to validate the certificate without the CRL.

The method may further include receiving, from the external device, a request to provide a seed value.

The method may further include receiving, from the certificate validation server, a validation result of the certificate; and sending, to the external device, the validation result of the certificate and the seed value.

The method may further include authenticating, based on the validation result of the certificate and based on the seed value, the external device.

The method may further include verifying a signature of the certificate.

The method may further include extracting, from the certificate, a public key associated with the external device.

The controller may include a gateway that is installed in the vehicle.

The external device may include an external diagnostic device communicatively connected to the vehicle to diagnose the vehicle.

According to one or more example embodiments of the present disclosure, a method may include: receiving, by a controller of a vehicle and from an external device, a certificate for authenticating the external device; based on a determination that a wireless communication is unavailable between the controller and a certificate validation server: receiving, by the controller and from the external device, a certificate revocation list (CRL) for verification of validity of the certificate; and verifying, based on the CRL, the validity of the certificate.

The method may further include receiving, from the external device, a request to provide a seed value.

The method may further include verifying a signature of the certificate.

The method may further include, based on the determination that the wireless communication is unavailable between the controller and the certificate validation server, requesting, by the controller, the external device to provide the CRL.

The method may further include receiving a request for a seed value.

The method may further include extracting, from the certificate, a public key associated with the external device.

The controller may include a gateway that is installed in the vehicle.

The external device may include an external diagnostic device communicatively connected to the vehicle to diagnose the vehicle.

According to one or more example embodiments of the present disclosure, a vehicle may include: a controller communicatively connected to an external device. The controller may include one or more processors and memory. The memory may store instructions that, when executed by the one or more processors, cause the vehicle to: receive, from the external device, a certificate for authenticating the external device; and based on a determination that wireless communication is available between the controller and a certificate validation server: send, to the certificate validation server, the certificate without a certificate revocation list (CRL) for verification of validity of the certificate; and request the certificate validation server to validate the certificate without the CRL. The instructions, when executed by the one or more processors, may further cause the vehicle to, based on a determination that the wireless communication is unavailable between the controller and the certificate validation server: receive, from the external device, the CRL; and verify, based on the CRL, the validity of the certificate.

The instructions, when executed by the one or more processors, may further cause the vehicle to receive, from the external device, a request to provide a seed value.

The instructions, when executed by the one or more processors, may further cause the vehicle to receive, from the certificate validation server, a validation result of the certificate; and send, to the external device, the validation result of the certificate and the seed value.

The instructions, when executed by the one or more processors, may further cause the vehicle to: authenticate, based on the validation result of the certificate and based on the seed value, the external device.

BRIEF DESCRIPTION OF THE DRAWINGS

These and/or other aspects of the disclosure will become apparent and more readily appreciated from the following description of one or more example embodiments, taken in conjunction with the accompanying drawings of which:

FIG. 3 illustrates an example of a certificate delivery and seed request message transmitted to a central gateway of a vehicle from an external diagnostic device;

FIG. 5 illustrates an example of a certificate revocation list (CRL) request message and a CRL delivery and seed request message transmitted between a central gateway and an external diagnostic device.

DETAILED DESCRIPTION

Figure 1:
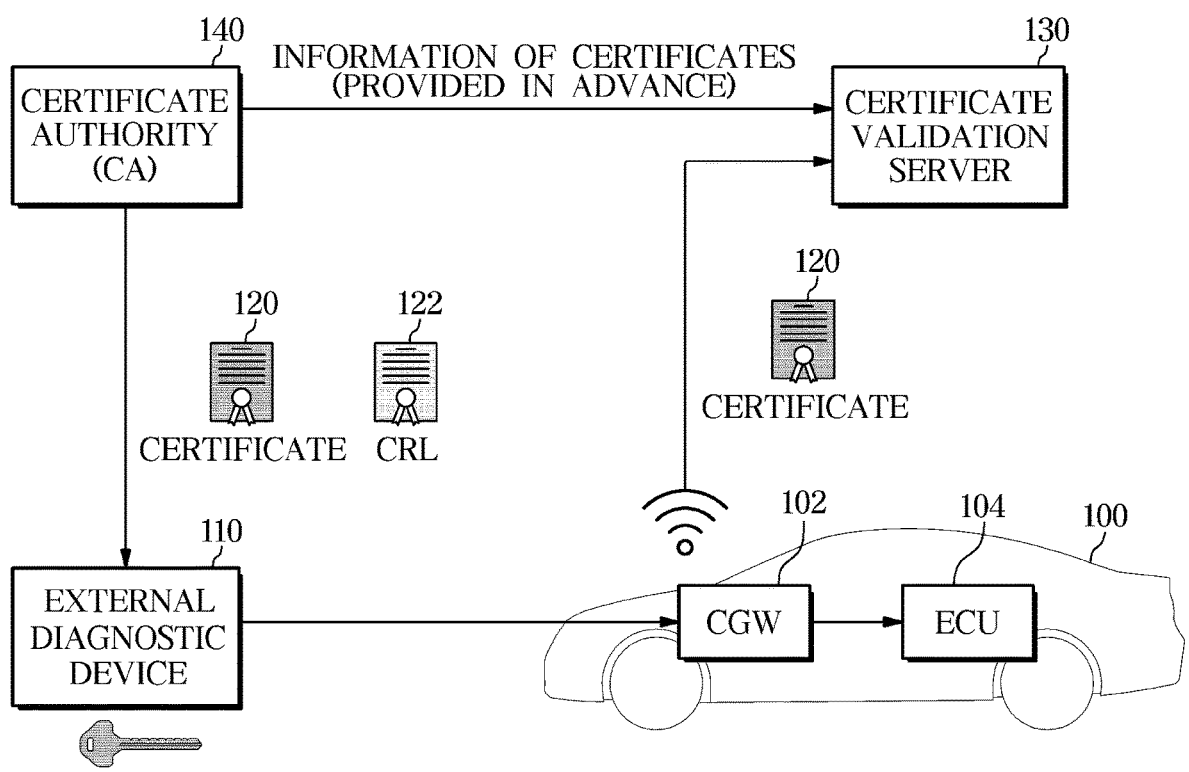
FIG. 1 is a diagram illustrating a configuration of devices for authenticating an external diagnostic device.

Like reference numerals throughout the specification denote like elements. Also, this specification does not describe all the elements according to one or more example embodiments of the disclosure, and descriptions well-known in the art to which the disclosure pertains or overlapped portions are omitted. The terms such as "~part", "~module", and the like may refer to at least one process processed by at least one hardware or software. A plurality of "~parts", "~modules" may be embodied as a single element, or a single of a "~part", "~module" may include a plurality of elements.

It should be understood that when an element is referred to as being "connected" to another element, it can be directly or indirectly connected to the other element, wherein the indirect connection includes "connection" via a wireless communication network.

It should be understood that the term "include" when used in this specification, specifies the presence of stated features, integers, steps, operations, elements, and/or components, but does not preclude the presence or addition of at least one other features, integers, steps, operations, elements, components, and/or groups thereof.

It should be understood that when it is stated in this specification that a member is located "on" another member, not only a member may be in contact with another member, but also still another member may be present between the two members.

It should be understood that, although the terms first, second, etc. may be used herein to describe various elements, these elements should not be limited by these terms.

It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

Hereinafter, an operation principle and one or more example embodiments of the disclosure are described in detail with reference to the accompanying drawings.

A user terminal (e.g., external diagnostic device, and the like) may be implemented as a computer or a portable terminal capable of being connected to a vehicle via a network. Here, the computer may include, for example, a laptop, a desktop, a tablet personal computer (PC), a slate PC, and the like, equipped with a web browser. The portable terminal may include, for example, all kinds of wireless communication devices that guarantee portability and mobility such as a personal communication system (PCS), a global system for mobile communication (GSM), a personal digital cellular (PDC), a personal handyphone system (PHS), a personal digital assistant (PDA), an international mobile telecommunication (IMT)-2000, a code division multiple access (CDMA)-2000, a wideband CDMA (WCDMA), a wireless broadband Internet (WiBro) terminal, all kinds of handheld-based wireless communication devices such as a smartphone, wearable devices such as a watch, ring, bracelet, anklet, necklace, eyeglasses, contact lenses, or head-mounted-device (HMD), and the like.

FIG. 1 is a diagram illustrating a configuration of devices for authenticating an external diagnostic device. As shown in FIG. 1, a vehicle 100 includes a central gateway (CGW) 102 and an electronic control unit (ECU) 104. The ECU 104 controls overall operations of the vehicle 100. In particular, the ECU 104 may control or provide information for diagnosis of an external diagnostic device 110 connected through the CGW 102. The CGW 102 may be a controller provided in the vehicle 100 to perform control and communication with other electronic control unit 104 in the vehicle 100. The external diagnostic device 110 is an example of an external device connected to the vehicle 100. The external device is not limited to the external diagnostic device 110, and may be any device requiring authentication through a certificate for connection with the vehicle 100.

In response to a certificate validation request transmitted from the external diagnostic device 110, the CGW 102 of the vehicle 100 is involved in overall validation processes on a certificate 120 and a certificate revocation list (CRL) 122. The certificate 120 is issued by a manufacturer of the vehicle 100 to authenticate the external diagnostic device 110. The CRL 122 includes information about whether the certificate 120 is valid/expired. If the certificate validation request is received from the external diagnostic device 110, the CGW 102 determines whether wireless communication is available between the CGW 102 itself and a certificate validation server 130, and if it is determined that the wireless communication is available between the CGW 102 itself and the certificate validation server 130, controls the certificate validation server 130 to validate the certificate 120. (refer to FIGS. 2 and 3) In this instance, the CRL 122 is not provided by the CGW 102 to the certificate validation server 130. If the wireless communication is unavailable between the CGW 102 itself and the certificate validation server 130, the CGW 102 is provided with the CRL 122 from the external diagnostic device 110 without using the certificate validation server 130, and performs certificate validation for the external diagnostic device 110 using the CRL 122. (refer to FIGS. 4 and 5) In this instance, the CRL 122 may be provided by the CGW 102 to the certificate validation server 130.

The certificate validation server 130 has information about all certificates distributed from a certificate authority (CA) 140 which is a certificate issuing authority. After a certificate validation request is received from the vehicle 100, the certificate validation server 130 may validate the certificate 120 by referring to the information about all the certificates. A validation result of the certificate 120 performed by the certificate validation server 130 is delivered to the CGW 102 of the vehicle 100.

The CA 140 issues the certificate 120 of the external diagnostic device 110 and the CRL 122. The CA 140 may be a manufacturer of the vehicle 100.

The ECU 104 may be implemented as a memory (not shown) that stores an algorithm for controlling operations of constituent components of the vehicle 100 or data about a program that reproduces the algorithm, and a processor (not shown) that performs the above-described operations using the data stored in the memory. In this instance, the memory and the processor may be provided as one chip, or provided as separate chips.

A communicator may include at least one constituent component enabling communication with an external device, for example, at least one of a short-range communication module, wireless communication module, or a wired communication module.

The short-range communication module may include a variety of short-range communication modules that transmit and receive signals in a short distance using a wireless communication network, such as a Bluetooth module, infrared communication module, radio frequency identification (RFID) communication module, wireless local access network (WLAN) communication module, near-field communication (NFC) communication module, Zigbee communication module, and the like.

The wired communication module may include various wired communication modules such as a controller area network (CAN) communication module, local area network (LAN) module, wide area network (WAN) module, value added network (VAN) module, or the like, and also include various cable communication modules such as a universal serial bus (USB), high definition multimedia interface (HDMI), digital visual interface (DVI), recommended standard 232 (RS-232), power line communication, plain old telephone service (POTS), or the like.

The wireless communication module may include wireless communication modules that support a variety of wireless communication methods such as a global system for mobile communication (GSM), code division multiple access (CDMA), wideband CDMA (WCDMA), universal mobile telecommunications system (UMTS), time division multiple access (TDMA), long term evolution (LTE), ultra wideband (UWB), and the like, in addition to a WIFI module and a WIBRO module.

The wireless communication module may include a wireless communication interface including an antenna and a transmitter transmitting a signal. Also, the wireless communication module may further include a signal conversion module modulating a digital control signal, output from the controller through the wireless communication interface under control of the controller, into an analog wireless signal.

The wireless communication module may include a wireless communication interface including an antenna and a receiver receiving a signal. Also, the wireless communication module may further include a signal conversion module demodulating an analog wireless signal received through the wireless communication interface into a digital control signal.

A storage may be implemented with at least one of a volatile memory such as a random access memory (RAM), a non-volatile memory such as a cache, a flash memory, a read only memory (ROM), a programmable read only memory (PROM), an erasable programmable read only memory (EPROM), an electrically erasable programmable read only memory (EEPROM), etc., or a recording media such as a hard disk drive (HDD), or a compact disc read only memory (CD-ROM), without being limited thereto. In relation to the controller, the memory and a processor may be integrated into one chip, or provided in physically separated locations.

A display may be provided as a cathode ray tube (CRT), a digital light processing (DLP) panel, a plasma display panel (PDP), liquid crystal display (LCD) panel, electro luminescence (EL) panel, electrophoretic display (EPD) panel, electrochromic display (ECD) panel, light emitting diode (LED) panel, organic LED (OLED) panel, and the like, without being limited thereto.

An input device may include a hardware device such as various buttons or switches, a pedal, a keyboard, a mouse, a track-ball, various levers, a handle, a stick, and the like.

Also, the input device may include a graphical user interface (GUI) such as a touch pad, i.e., a software device. The touch pad may be implemented as a touch screen panel (TSP) and form a mutual layer structure with a display.

When implemented as a TSP forming a mutual layer structure with a touch pad, the display may be used as the input device.

At least one constituent component may be added or omitted corresponding to the performance of the constituent components illustrated in FIG. 1. Also, it will be easily understood by those skilled in the art that mutual positions of the constituent components may be modified corresponding to the performance or structure of the constituent components.

Meanwhile, each of the constituent components shown in FIG. 1 refers to a software, and/or a hardware component such as a field-programmable gate array (FPGA) or an application-specific integrated circuit (ASIC).

Figure 2:
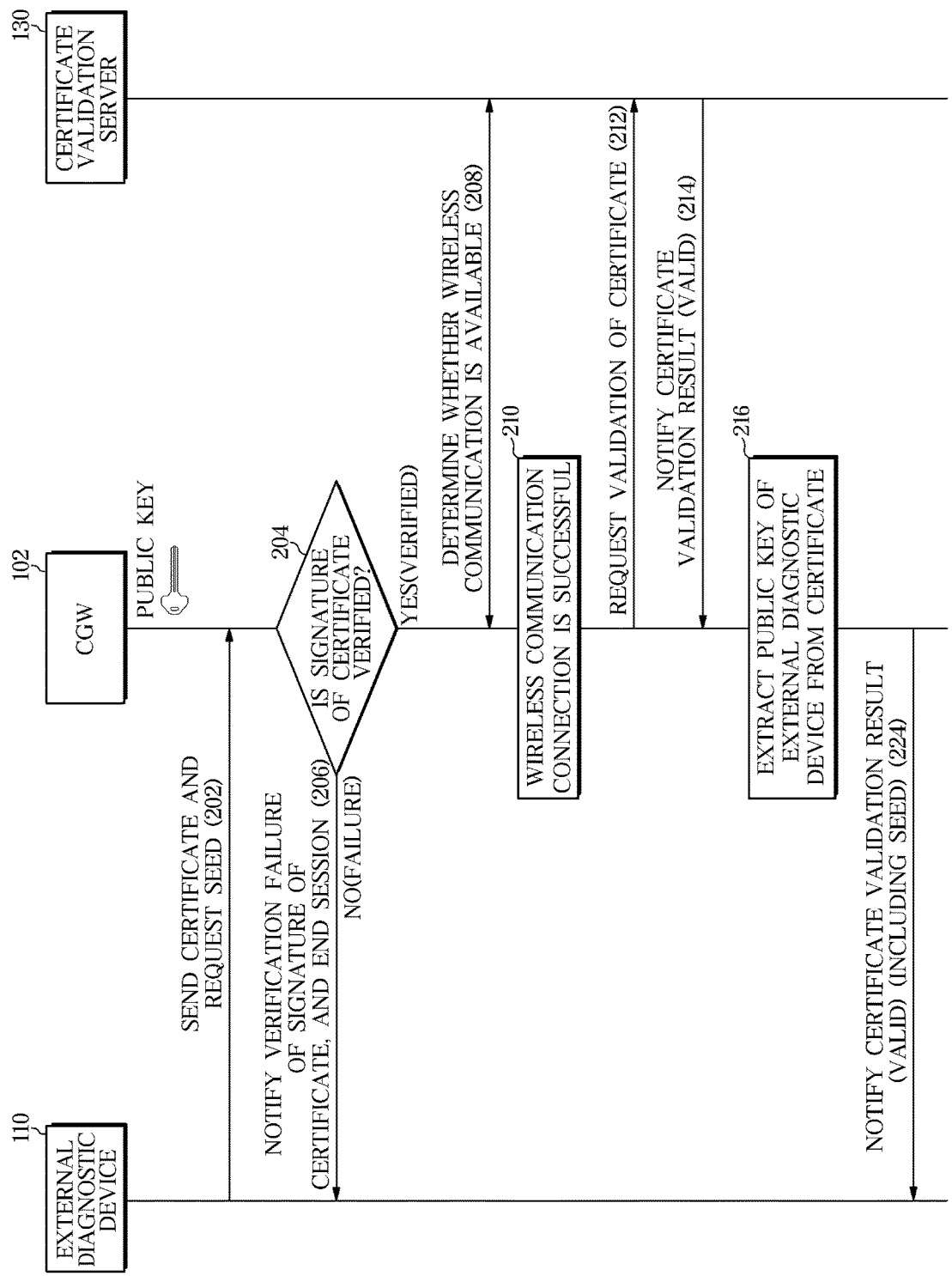
FIG. 2 is a flowchart for a certificate validation method of a vehicle.

FIG. 2 is a flowchart for a certificate validation method of a vehicle. In particular, FIG. 2 illustrates a method of authenticating the external diagnostic device 110 in a state where the CGW 102 of the vehicle 100 and the certificate validation server 130 in a remote location are connected to enable wireless communication (e.g., transmission control protocol (TCP) communication).

If the CGW 102 of the vehicle 100 and the external diagnostic device 110 are connected through a communication cable, the external diagnostic device 110 delivers the certificate 120 of the external diagnostic device 110 itself to the CGW 102 of the vehicle 100, and requests the CGW 102 to provide a seed (also referred to as a random seed, a cryptographic seed, a seed value, etc.) to the external diagnostic device 110 (202).

FIG. 3 illustrates an example of a certificate delivery and seed request message transmitted to a CGW of a vehicle from an external diagnostic device. As shown in FIG. 3, a certificate delivery and seed request message 310 includes a corresponding byte, a parameter name and a hexadecimal (HEX) value. Byte represents a byte configuration of each parameter. The hexadecimal value is a hexadecimal value assigned to a corresponding parameter. The parameters include a security identifier (SID), a security access type (SecurityAccessType), and a security access data (SecurityAccessDataRecord). In FIG. 3, the security access type (SecurityAccessType) is certificate delivery and seed request, and the security access data (SecurityAccessDataRecord) is a certificate. That is, FIG. 3 indicates that the message 310 is for certificate delivery and seed request and the certificate 120 is attached to the message 310. The certificate delivery and seed request message 310 shown in FIG. 3 is transmitted to the CGW 102 together with the certificate 120.

Referring again to FIG. 2, if the certificate 120 and the seed provision request are received from the external diagnostic device 110, the CGW 102 verifies a digital signature of the certificate 120 using a public key possessed by the CGW 102 (204).

If the CGW 102 fails to verify the signature of the certificate 120 (No (failure) in operation 204), the CGW 102 transmits a response for notifying the failure in verification of the signature of the certificate 120, and ends a session (206). The failure in verification of the signature refers to that the corresponding signature is invalid.

By contrast, if the CGW 102 succeeds in verifying the signature of the certificate 120 (Yes (verified) in operation 204), the CGW 102 determines whether the CGW 102 and the certificate validation server 130 in a remote location are connected online to enable wireless communication (e.g., transmission control protocol (TCP) communication (208). That is, if the verification of the signature is successful, the CGW 102 attempts to access the certificate validation server 130 in the remote location. The success in verification of the signature refers to that the corresponding signature is valid.

If the CGW 102 and the certificate validation server 130 in the remote location are connected online to enable wireless communication (210), the CGW 102 delivers the certificate 120 received from the external diagnostic device 110 to the certificate validation server 130 in the remote location, and requests validation of the certificate 120 (212). If the CGW 102 has not established a regular session with the certificate validation server 130, the CGW 102 may establish a session to the certificate validation server 130 to deliver the certificate 120 through the corresponding session and request validation. In this instance, the CRL 122 is not provided by the CGW 102 to the certificate validation server 130. Accordingly, in FIG. 2, the external diagnostic device 110 may not necessarily require to possess the CRL 122 related to the certificate 120, and no update to a latest CRL 122 may necessarily be required. That is, the authentication method (certificate validation method) of FIG. 2 may be performed, even if the external diagnostic device 110 does not include the CRL 122 or the CRL 122 is not a latest version.

In response to the request from the CGW 102, the certificate validation server 130 validates the certificate of the external diagnostic device 110, and if a result of the validation is valid, notifies the CGW 102 of a positive validation result (valid) (214).

If the certificate validation server 130 succeeds in validating the certificate 120 (certificate is valid), the CGW 102 extracts a public key of the external diagnostic device 110 from the certificate 120 of the external diagnostic device 110 (216), and delivers, to the external diagnostic device 110, a positive response code (PRC) including a seed and the certificate validation result received (notified) from the certificate validation server 130 (222). By contrast, if the certificate validation server 130 fails to validate the certificate 120 (i.e., it is determined that the certificate is invalid), the CGW 102 may transmit, to the external diagnostic device 110, a negative response code (NRC) together with information about why validation of the certificate 120 failed.

Afterwards, the external diagnostic device 110 may sign a seed with a private key of the external diagnostic device 110, and perform validation by using the public key extracted from the CGW 102, thereby completing authentication of the external diagnostic device 110.

Figure 4:
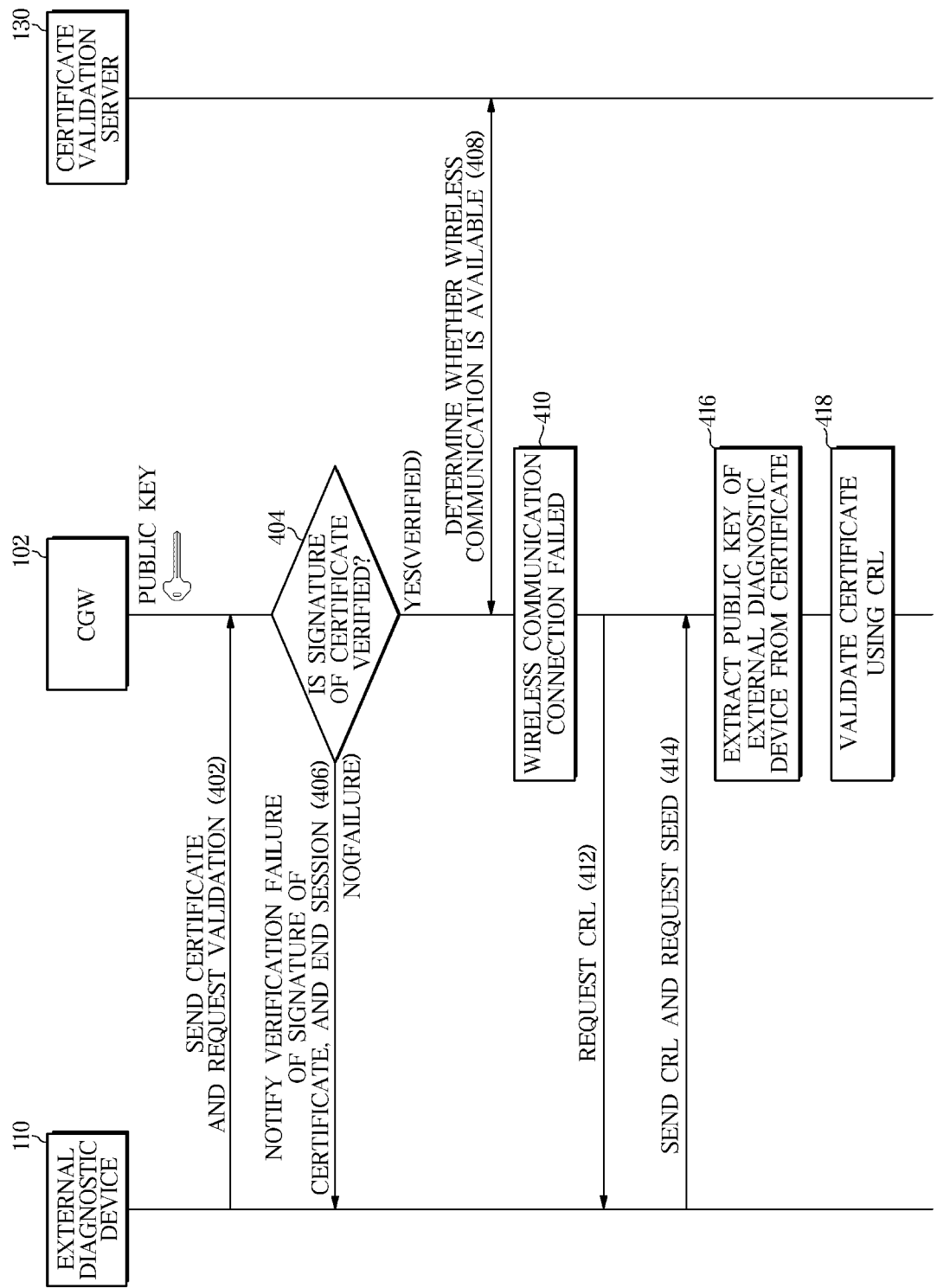
FIG. 4 is a flowchart for a certificate validation method of a vehicle.

FIG. 4 is a flowchart for a certificate validation method of a vehicle. In particular, FIG. 4 illustrates a method of authenticating the external diagnostic device 110 in a state where wireless communication (e.g., TCP communication) is unavailable between the CGW 102 of the vehicle 100 and the certificate validation server 130 in a remote location.

If the CGW 102 of the vehicle 100 and the external diagnostic device 110 are connected through a communication cable, the external diagnostic device 110 delivers the certificate 120 of the external diagnostic device 110 itself to the CGW 102 of the vehicle 100, and requests validation of the certificate 120 (402). In this instance, the external diagnostic device 110 may request a seed together with the request for validation of the certificate 120. In this instance, the external diagnostic device 110 transmits the certificate delivery and seed request message 310 (refer to FIG. 3) to the CGW 102. That is, as described above with reference to FIG. 3, the certificate delivery and seed request message 310 includes a corresponding byte, a parameter name and a hexadecimal (HEX) value. Byte represents a byte configuration of each parameter. The hexadecimal value is a hexadecimal value assigned to a corresponding parameter. The parameters include a security identifier (SID), a security access type (SecurityAccessType), and a security access data (SecurityAccessDataRecord). In FIG. 3, the security access type (SecurityAccessType) is certificate delivery and seed request, and the security access data (SecurityAccessDataRecord) is a certificate. That is, FIG. 3 indicates that the message 310 is for certificate delivery and seed request and the certificate 120 is attached to the message 310. The certificate delivery and seed request message 310 shown in FIG. 3 is transmitted to the CGW 102 together with the certificate 120.

Referring again to FIG. 4, after the certificate 120 and the seed provision request are received from the external diagnostic device 110, the CGW 102 verifies a digital signature of the certificate 120 using a server public key possessed by the CGW 102 (404).

If the CGW 102 fails to verify the signature of the certificate 120 (No (failure) in operation 404), the CGW 102 transmits a response for notifying the failure in verification of the signature of the certificate 120, and ends a session (406). The failure in verification of the signature refers to that the corresponding signature is invalid.

By contrast, if the CGW 102 succeeds in verifying the signature of the certificate 120 (Yes (verified) in operation 404), the CGW 102 determines whether the CGW 102 and the certificate validation server 130 in a remote location are connected online to enable wireless communication (e.g., TCP communication) (408). That is, if the verification of the signature is successful, the CGW 102 attempts to access the certificate validation server 130 in the remote location. The access attempt may be repeated the preset number of times. The success in verification of the signature refers to that the corresponding signature is valid.

Despite the repeated access attempts, if the wireless communication is unavailable between the CGW 102 and the certificate validation server 130 in the remote location (410), the CGW 102 transmits, to the external diagnostic device 110, a positive response code for requesting the external diagnostic device 110 to provide the CRL 122 (412). As shown in FIG. 4, the external diagnostic device 110 may be required to have the CRL 122 related to the certificate 120. Also, the CRL 122 may be required to be an updated latest version. That is, because the communication between the CGW 102 and the certificate validation server 130 is unavailable, like an existing offline method, the updated latest CRL 122 as well as the certificate 120 of the external diagnostic device 110 may be needed to be secured in order to perform the authentication method (certificate validation method) of FIG. 4. If the external diagnostic device 110 does not have the CRL 122, a session between the external diagnostic device 110 and the CGW 102 is no longer maintained and comes to an end.

FIG. 5 illustrates an example of a CRL request message and a CRL delivery and seed request message transmitted between a CGW and an external diagnostic device. In FIG. 5, a CRL request message 510 transmitted from the CGW 102 to the external diagnostic device 110 is illustrated. As shown in FIG. 5, the CRL request message 510 includes a corresponding byte, a parameter name and a hexadecimal (HEX) value. Byte represents a byte configuration of each parameter. The hexadecimal value is a hexadecimal value assigned to a corresponding parameter. The parameters include a security identifier (SID), a security access type (SecurityAccessType), and a security access data (SecurityAccessDataRecord). In the CRL request message 510 of FIG. 5, the security access type (SecurityAccessType) is certificate delivery and seed request, and the security access data (SecurityAccessDataRecord) is a request for CRL. That is, the CRL request message 510 indicates that the message 510 is for requesting the CRL and the request for the CRL is included in the message 510. The CRL request message 510 shown in FIG. 5 is transmitted to the external diagnostic device 110 from the CGW 102.

Referring again to FIG. 4, if the CRL 122 matching the certificate 120 exists, the external diagnostic device 110 transmits, to the CGW 102, a message for transmission of the corresponding CRL 122 and seed request (414). In FIG. 5 described above, a CRL delivery and seed request message 520 transmitted to the CGW 102 from the external diagnostic device 110 is illustrated. As shown in FIG. 5, the CRL delivery and seed request message 520 includes a corresponding byte, a parameter name and a hexadecimal (HEX) value. Byte represents a byte configuration of each parameter. The hexadecimal value is a hexadecimal value assigned to a corresponding parameter. The parameters include a security identifier (SID), a security access type (SecurityAccessType), and a security access data (SecurityAccessDataRecord). In the message 520 of FIG. 5, the security access type (SecurityAccessType) is CRL delivery and seed request, and the security access data (SecurityAccessDataRecord) is the CRL. That is, the CRL delivery and seed request message 520 indicates that the message 520 is for CRL delivery and seed request and the CRL is included in the message 520. The CRL delivery and seed request message 520 shown in FIG. 5 is transmitted from the external diagnostic device 110 to the CGW 102.

Referring again to FIG. 4, the CGW 102, which receives the corresponding CRL 122 delivery and seed request message 520 from the external diagnostic device 110, extracts a public key of the external diagnostic device 110 from the certificate 120 of the external diagnostic device 110 (416), and validates the certificate 102 using the received CRL 122 (418).

Afterwards, the external diagnostic device 110 may signs a seed with a private key of the external diagnostic device 110, and perform validation by using the public key extracted from the CGW 102, thereby completing authentication of the external diagnostic device 110.

Meanwhile, the above-described example embodiment(s) can be stored in the form of a recording medium storing computer-executable instructions. The instructions may be stored in the form of a program code, and when executed by a processor, the instructions may perform operations of the disclosed embodiments. The recording medium may be implemented as a computer-readable recording medium.

The computer-readable recording medium includes all kinds of recording media in which instructions which may be decoded by a computer are stored of, for example, a read only memory (ROM), random access memory (RAM), magnetic tapes, magnetic disks, flash memories, optical recording medium, and the like.

As is apparent from the above, according to the embodiments of the disclosure, online certificate validation of an external diagnostic device can be performed in a wireless method. Also, if online validation in a wireless method of an external diagnostic device is not available, offline certificate validation in a wired method can be performed by selectively performing online validation in a wireless method or offline validation in an existing wired method depending on a communication state.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:
1. A method comprising:
receiving, by a controller including a gateway installed at an on-board diagnostic connector of a vehicle and from an external device including an external diagnostic device communicatively connected to the on-board diagnostic connector to diagnose the vehicle, a certificate for authenticating the external diagnostic device;
based on a determination that wireless communication is available between the controller and a certificate validation server:
    sending, by the controller and to the certificate validation server, the certificate without a certificate revocation list (CRL) for verification of validity of the certificate; and
    requesting the certificate validation server to validate the certificate without the CRL; and
based on a determination that wireless communication is unavailable between the controller and the certificate validation server:
    requesting, by the controller, the CRL for validation of the certificate by sending a CRL request message to the external diagnostic device;
    based on the CRL request message, receiving, by the controller, the CRL from the external diagnostic device; and verifying, based on the received CRL, the validity of the certificate.

2. The method of claim 1, further comprising:
receiving, from the external device, a request to provide a seed value.

3. The method of claim 2, further comprising:
receiving, from the certificate validation server, a validation result of the certificate; and
sending, to the external device, the validation result of the certificate and the seed value.

4. The method of claim 3, further comprising:
authenticating, based on the validation result of the certificate and based on the seed value, the external device.

5. The method of claim 1, further comprising:
verifying a signature of the certificate.

6. The method of claim 1, further comprising:
extracting, from the certificate, a public key associated with the external device.

7. A method comprising:
receiving, by a controller including a gateway installed at an on-board diagnostic connector of a vehicle and from an external device including an external diagnostic device communicatively connected to the on-board diagnostic connector to diagnose the vehicle, a certificate for authenticating the external diagnostic device; and
based on a determination that a wireless communication is unavailable between the controller and a certificate validation server:
  requesting, by the controller, a certificate revocation list (CRL) for validation of the certificate by sending a CRL request message to the external diagnostic device;
  based on the CRL request message, receiving, by the controller and from the external diagnostic device, the CRL for verification of validity of the certificate; and
  verifying, based on the received CRL, the validity of the certificate.

8. The method of claim 7, further comprising:
receiving, from the external device, a request to provide a seed value.

9. The method of claim 7, further comprising:
verifying a signature of the certificate.

10. The method of claim 7, further comprising:
receiving a request for a seed value.

11. The method of claim 7, further comprising:
extracting, from the certificate, a public key associated with the external device.

12. A vehicle comprising:
a controller including a gateway installed at an on-board diagnostic connector communicatively connected to an external device including an external diagnostic device communicatively connected to the on-board diagnostic connector to diagnose the vehicle, wherein the controller comprises:
one or more processors; and
memory storing instructions that, when executed by the one or more processors, cause the vehicle to:
  receive, from the external diagnostic device, a certificate for authenticating the external diagnostic device;
  based on a determination that wireless communication is available between the controller and a certificate validation server:
    send, to the certificate validation server, the certificate without a certificate revocation list (CRL) for verification of validity of the certificate; and
    request the certificate validation server to validate the certificate without the CRL; and
  based on a determination that the wireless communication is unavailable between the controller and the certificate validation server:
    request, by the controller, the CRL for validation of the certificate by sending a CRL request message to the external diagnostic device;
    based on the CRL request message, receive, from the external diagnostic device, the CRL; and
    verify, based on the received CRL, the validity of the certificate.

13. The vehicle of claim 12, wherein the instructions, when executed by the one or more processors, further cause the vehicle to:
receive, from the external device, a request to provide a seed value.

14. The vehicle of claim 13, wherein the instructions, when executed by the one or more processors, further cause the vehicle to:
receive, from the certificate validation server, a validation result of the certificate; and
send, to the external device, the validation result of the certificate and the seed value.

15. The vehicle of claim 14, wherein the instructions, when executed by the one or more processors, further cause the vehicle to:
authenticate, based on the validation result of the certificate and based on the seed value, the external device.

* * * * *